US012788039B2

(12) United States Patent
Kiefl et al.

(10) Patent No.: US 12,788,039 B2
(45) Date of Patent: Nov. 10, 2026

(54) FLAVORING COMPOSITIONS FOR TASTE IMPROVEMENT

(71) Applicant: SYMRISE AG, Holzminden (DE)

(72) Inventors: Johannes Kiefl, Neustadt an der Aisch (DE); Margit Liebig, Stadtoldendorf (DE); Christoph Harms, Holzminden (DE); Rebecca Wiebusch, Holzminden (DE); Tom Somers, Holzminden (DE); Jakob Peter Ley, Holzminden (DE)

(73) Assignee: SYMRISE AG, Holzminden (DE)

( * ) Notice: Subject to any disclaimer, the term of this patent is extended or adjusted under 35 U.S.C. 154(b) by 101 days.

(21) Appl. No.: 18/005,895

(22) PCT Filed: Aug. 9, 2022

(86) PCT No.: PCT/EP2022/072326

§ 371 (c)(1),
(2) Date: Jan. 18, 2023

(87) PCT Pub. No.: WO2023/017021

PCT Pub. Date: Feb. 16, 2023

(65) Prior Publication Data

US 2024/0245085 A1 Jul. 25, 2024

(30) Foreign Application Priority Data

Aug. 10, 2021 (WO) ................. PCT/EP2021/072252

(51) Int. Cl.

| | |
|---|---|
| ***A23L 27/20*** | (2016.01) |
| ***A23L 19/00*** | (2016.01) |
| ***A23L 27/00*** | (2016.01) |
| ***A23L 27/12*** | (2016.01) |

(52) U.S. Cl.

CPC ........... *A23L 27/2052* (2016.08); *A23L 19/07* (2016.08); *A23L 27/13* (2016.08); *A23L 27/84* (2016.08)

(58) Field of Classification Search

CPC ...... A23L 27/2052; A23L 19/07; A23L 27/13; A23L 27/84; A23L 29/212; A23L 29/256; A23L 29/262; A23L 33/115; A23L 33/185; A23V 2200/15; A23V 2200/16; A23V 2250/21

See application file for complete search history.

(56) References Cited

U.S. PATENT DOCUMENTS

2017/0014439 A1 1/2017 Brewster et al.

FOREIGN PATENT DOCUMENTS

| | | | | |
|---|---|---|---|---|
| EP | 1783193 | A1 | | 5/2007 |
| EP | 2017272 | A2 | | 1/2009 |
| EP | 2756765 | A1 | | 7/2014 |
| JP | 2009057319 | A | * | 3/2009 |
| JP | 2018087170 | A | | 6/2018 |
| JP | 2018143212 | A | | 9/2018 |
| JP | 2019064958 | A | | 4/2019 |

OTHER PUBLICATIONS

PE2E Translation of Masako et al. JP 2009057319 (Year: 2009).*

International Search Report and Written Opinion issued on May 9, 2022 for corresponding PCT Application No. PCT/EP2021/072252.

Giuseppina Mandalari et al., "Characterization of Falvonoids and Pectins from Bergamot (Citrus bergamia Risso) Peel, a Major Byproduct of Essential Oil Extraction," Journal of Agricultural and Food Chemistry, vol. 54, No. 1, 2005, pp. 197-203 XP055914355.

International Search Report and Written Opinion issued on Nov. 21, 2022 for corresponding PCT Application No. PCT/EP2022/072326.

English translation of Japanese Office Action issued on Aug. 28, 2023 for corresponding Japanese Application No. 2023-515348.

Jakob P. Ley et al., "New Bitter-Masking Compounds: Hydroxylated Benzoic Acid Amides of Aromatic Amines as Structural Analogues of Homoeriodictyol," Journal of Agricultural and Food Chemistry, vol. 54, 2006, pp. 8574-8579.

Anonymous: "Low molecular weight taste-modifying substance, Eriodictyol that is expected to inhibit the biding between the spike protein of the novel coronavirus (SARS-CoV-2) and ACE2", Research reagents, antibodies, equipment, and outsourcing services on the Funakoshi Co., Ltd. website [Online], 2022, https://www.funakoshi.co.jp/contents/67242 [Dated searched: Aug. 18, 2023] (Publication showing well-known technology).

* cited by examiner

*Primary Examiner* — Nikki H. Dees
*Assistant Examiner* — Stephanie R Gerla
(74) *Attorney, Agent, or Firm* — POLSINELLI PC

(57) ABSTRACT

The present invention relates to flavoring compositions comprising eriocitrin, eriodictyol-7-O-glucoside and eriodictyol for taste improvement. Furthermore, the present invention relates to a method to produce such flavoring compositions as well as their use for taste improvement as well as a method for improving taste characteristics in a preparation.

2 Claims, No Drawings

FLAVORING COMPOSITIONS FOR TASTE IMPROVEMENT

CROSS-REFERENCE TO RELATED APPLICATIONS

This application is a national stage application (under 35 U.S.C. § 371) of PCT/EP2022/072326, filed Aug. 9, 2022, which claims benefit of PCT Application No. PCT/EP2021/072252, filed Aug. 10, 2021, which are incorporated herein by reference in their entireties.

The present invention relates to flavoring compositions comprising eriocitrin, eriodictyol-7-O-glucoside and eriodictyol for taste improvement. Furthermore, the present invention relates to a method to produce such flavoring compositions as well as their use for taste improvement as well as a method for improving taste characteristics in a preparation.

The need for new substances or compositions for the improvement of taste characteristics in preparations such as food, beverages or hygiene products is constantly high. Various substances can be present in food and beverages, which have an unpleasant taste, e.g. bitter substances, strongly sour substances and astringent substances, which on the one hand in moderation are desirable and characteristic (e.g. caffeine in tea or coffee, tannins in red wine or green tea, quinine in so-called bitter-lemon beverages, saponins or isoflavonoids or glycosides thereof in soya milk, hop extracts in beer, fruit acids or edible acids in sweet fruit juices), but on the other hand can also greatly reduce the value. Often, the unpleasant taste is further intensified by an unpleasant odor, for example in soya milk, which often has a bitter and astringent taste, a note generally designated as "beany" is also described as unpleasant.

Bitter taste is regularly caused by particular substances, which bind to special bitter receptors on taste cells (which are to be found in the so-called taste buds on the tongue) and, via neurochemical cascades, send a signal to the brain, which causes a defence reaction and a negative taste impression (cf. Wolfgang Meyerhof, Reviews of Physiology, Biochemistry and Pharmacology 2005, 154, 37-72).

Astringent taste is caused by precipitation of proline-rich proteins in the saliva by astringents, e.g. metal salts or tannins. The normally homogeneous saliva that serves as a "lubricant" then contains denatured proteins, which reduce the lubricity and so leave a rough or dry sensation in the mouth, which is also experienced as astringent (Isabelle Lesschaeve, Ann C. Noble, American Journal of Clinical Nutrition 2005, 81, 330S-335S).

Sour taste is caused by protic acids. The so-called titratable proton concentration is then more decisive than the pH for the sour impression: for example, a hydrochloric acid solution with the same pH as a malic acid solution tastes far less sour in comparison. In general, the aversive sour taste is toned down considerably by combining with sweet flavouring materials, principally sugar, or even by substances that taste salty, mainly sodium chloride, whereas the sour taste is perceived as much more unpleasant with bitter or astringent tasting substances.

Some of the known taste modulating substances to modify these taste impressions are eriodictyol and homoeriodictyol. The bitter masking activity of eriodictyol was first described in the European patent application EP 1258200 A2. Herein, *Eriodictyon californicum* was named as source for eriodictyol. The application does not disclose any information on the manufacturing nor on natural sources from which eriodictyol could be obtained. Also, it is not described, which effect eriodictyol has if it is present together with other taste modulation substances.

Eriodictyol is a flavanone. Flavanones in general can be obtained by organic acid-catalyzed hydrolysis of respective flavanone-glycosides as described in the European patent application EP2017272A2. However, the application only discloses the hydrolysis of >90% pure components such as hesperidin and phloridzin, which can be easily recovered. However, no information was disclosed on the hydrolysis of lower purity materials and its purification. It is well known that hydrolysis of lower purity materials forms undesirable by-components that impart a phenolic off-note to the product. Thus, the disclosed method does not teach a method for the economical production of eriodictyol from a natural source.

U.S. Ser. No. 10/596,185B2 describes eriocitrin- and eriodictyol-rich compositions made from lemon for use as anti-oxidants and anti-inflammatory agents. No information on the taste modulating properties of this composition as well as on the manufacturing process is disclosed.

JP2000217560A describes a method for obtaining eriocitrin-rich extracts from citrus fruit by solvent extraction followed by adsorption on polymer resin. However, the obtained product showed a Chinese herbal medicine-like smell. It is well known that polyphenol containing materials show off-notes and browning depending on process and storage conditions. This application does neither disclose a process to produce off-note free lemon extract nor a process to impart taste modulative functionality.

EP2223930A1 describes a process to obtain an eriocitrin-rich extract from citrus fruit by solvent extraction followed by resin adsorption. The inventors of this patent application addressed the off-note problem when using polymer resin by using phenol-formaldehyde modified resin where eriocitrin is physically adsorbed onto the surface but also chemically/by ion-exchange due the basic amino and weakly acidic phenol groups. The off-notes were reduced by this process. However, the invention does not disclose a taste modulative composition according to the present invention containing more active compounds than eriocitrin.

EP1783193A1 describes compositions comprising eriodictyol and eriocitrin. However, no (synergistic) effect on bitter-masking is described.

US 2017/0014439A1 describes compositions comprising eriocitrin and neoeriocitrin. However, the composition is directed to a medical purpose for treating inflammation and/or metabolic syndrome. No (synergistic) effect on bitter-masking is described.

Mandalari et al., Characterization of Flavonoids and Pectins from Bergamot (Citrus bergamia Risso) Peel, a Major Byproduct of Essential Oil Extraction", JOURNAL OF AGRICULTURAL AND FOOD CHEMISTRY, vol. 54, no. 1, 14 Dec. 2005 describes eriocitrin and neoeriocitrin in bergamot peel. However, no (synergistic) effect on bitter-masking is described.

EP2756765A1 describes the use of eriodictyol and/or homoeriodictyol as bitter masking agents in food and beverage compositions. However, no synergistic improvement of the bitter-masking effect of eriodictyol is described.

Thus it was the primary task of the present invention to provide a flavoring composition, which is able to improve the taste characteristics in a preparation, preferably the bitter and astringent taste, and is commercially producible with an economic process and, preferably, does not exhibit off-notes.

This task was primarily solved in a first aspect of the invention by providing a flavoring composition comprising eriocitrin, eriodictyol-7-O-glucoside and eriodictyol, and optionally neoeriocitrin, wherein, neoeriocitrin, if present, is contained in an amount of from 0.1 wt.-% to 40 wt.-%, preferably in an amount of from 0.1 to 10 wt.-%, eriocitrin is contained in an amount of from 0.1 wt.-% to 40 wt.-%, preferably in an amount of from 0.1 to 10 wt.-%, eriodictyol-7-O-glucoside is contained in an amount of from 0.2 wt.-% to 60 wt.-%, preferably in an amount of from 1 to 40 wt.-%, and eriodictyol is contained in an amount of from 5 wt.-% to 79 wt.-%, preferably in an amount of from 10 to 77 wt.-%, preferably in an amount of from 20 to 76 wt.-%, preferably in an amount of from 30 to 75 wt.-%, each dependent on the dry weight of the flavoring composition.

All weight percentages above are based on the dry weight of a flavoring composition. This means, water or solvents are excluded when determining the weight percentages. Thus, preferably, the dry weight is measured by subtracting the water content from the total weight of the composition, for which the dry weight shall be determined. Preferably, the water content is determined by Karl-Fisher Titration, loss-on-drying method or by a halogen moisture analyser.

In one embodiment of the present invention, the flavoring composition comprises neoeriocitrin in an amount of from 0.1 wt.-% to 40 wt.-%, preferably in an amount of from 0.1 to 10 wt.-%, eriocitrin, in an amount of from 0.1 wt.-% to 40 wt.-%, preferably in an amount of from 0.1 to 10 wt.-%, eriodictyol-7-O-glucoside, in an amount of from 0.2 wt.-% to 60 wt.-%, preferably in an amount of from 1 to 40 wt.-% and eriodictyol in an amount of from 5 wt.-% to 90 wt.-%, preferably in an amount of from 30 to 80 wt.-%.

In another embodiment of the present invention, the flavoring composition comprises neoeriocitrin in an amount of from 0.1 wt.-% to 40 wt.-%, preferably in an amount of from 0.1 to 10% and eriocitrin, in an amount of from 0.1 wt.-% to 40 wt.-%, preferably in an amount of from 0.1 to 10 wt.-%.

In yet another embodiment of the present invention, the flavoring composition comprises neoeriocitrin in an amount of from 0.1 wt.-% to 40 wt.-%, preferably in an amount of from 0.1 to 10 wt.-% and eriodictyol-7-O-glucoside, in an amount of from 0.2 wt.-% to 60 wt.-%, preferably in an amount of from 1 to 40 wt.-%.

In one embodiment of the present invention, the flavoring composition comprises neoeriocitrin in an amount of from 0.1 wt.-% to 40 wt.-%, preferably in an amount of from 0.1 to 10 wt.-% and eriodictyol in an amount of from 5 wt.-% to 90 wt.-%, preferably in an amount of from 30 to 80 wt.-%.

In another embodiment of the present invention the flavoring composition comprises eriocitrin, in an amount of from 0.1 wt.-% to 40 wt.-%, preferably in an amount of from 0.1 to 10 wt.-% and eriodictyol-7-O-glucoside, in an amount of from 0.2 wt.-% to 60 wt.-%, preferably in an amount of from 1 to 40 wt.-%.

In another embodiment of the present invention, the flavoring composition comprises eriocitrin, in an amount of from 0.1 wt.-% to 40 wt.-%, preferably in an amount of from 0.1 to 10 wt.-% and eriodictyol in an amount of from 5 wt.-% to 90 wt.-%, preferably in an amount of from 30 to 80 wt.-%.

In yet another embodiment of the present invention, the flavoring composition comprises eriodictyol-7-O-glucoside, in an amount of from 0.2 wt.-% to 60 wt.-%, preferably in an amount of from 1 to 40 wt.-% and eriodictyol in an amount of from 5 wt.-% to 90 wt.-%, preferably in an amount of from 30 to 80 wt.-%.

In one embodiment of the present invention, the flavoring composition comprises neoeriocitrin in an amount of from 0.1 wt.-% to 40 wt.-%, preferably in an amount of from 0.1 to 10 wt.-%, eriocitrin, in an amount of from 0.1 wt.-% to 40 wt.-%, preferably in an amount of from 0.1 to 10 wt.-% and eriodictyol-7-O-glucoside, in an amount of from 0.2 wt.-% to 60 wt.-%, preferably in an amount of from 1 to 40 wt.-%.

In an especially preferred embodiment of the present invention, the flavoring composition comprises eriocitrin, in an amount of from 0.1 wt.-% to 40 wt.-%, preferably in an amount of from 0.1 to 10 wt.-%, and eriodictyol-7-O-glucoside, in an amount of from 0.2 wt.-% to 60 wt.-%, preferably in an amount of from 1 to 40 wt.-% and eriodictyol in an amount of from 5 wt.-% to 90 wt.-%, preferably in an amount of from 30 to 80 wt.-%.

In another embodiment of the present invention, the flavoring composition comprises neoeriocitrin in an amount of from 0.1 wt.-% to 40 wt.-%, preferably in an amount of from 0.1 to 10 wt.-%, eriodictyol-7-O-glucoside, in an amount of from 0.2 wt.-% to 60 wt.-%, preferably in an amount of from 1 to 40 wt.-% and eriodictyol in an amount of from 5 wt.-% to 90 wt.-%, preferably in an amount of from 30 to 80 wt.-%.

Neoeriocitrin (I) is a 7-O-glycoside of the flavanone eriodictyol and the disaccharide neohesperidose (2-O-(alpha-L-rhamnopyranosyl)-beta-D-glucopyranoside). The term "neo" refers to the glycosyl moiety.

(I)

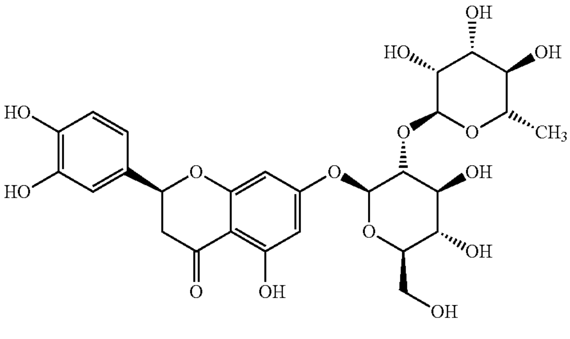

Eriocitrin (II) is a disaccharide derivative from eriodictyol that consists of eriodictyol substituted by rutinose 6-O-(alpha-L-rhamnopyranosyl)-beta-D-glucopyranosyl moiety at position 7 via a glycosidic linkage. In nature, it has a role as an antioxidant.

(II)

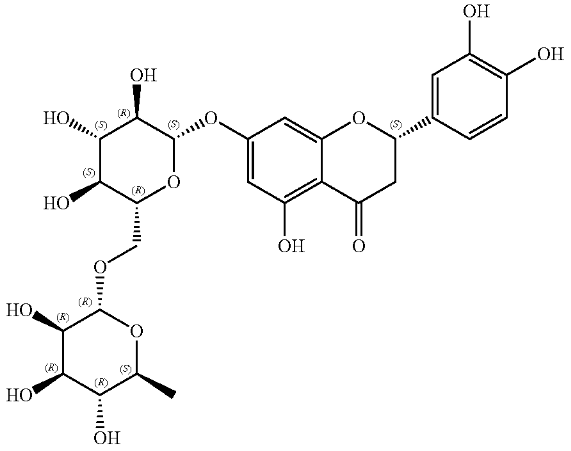

Eridictyol-7-O-glucoside (Ill) is a derivative of eriodictyol with a flavonoid moiety which is O-glycosidically linked to carbohydrate moiety at the C7-position.

(III)

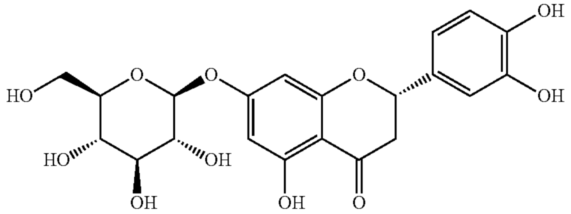

Eriodictyol (IV) is a flavanone substituted by hydroxy groups at positions 5, 7, 3' and 4' respectively extracted from yerba santa (*Eriodictyon californicum*).

(IV)

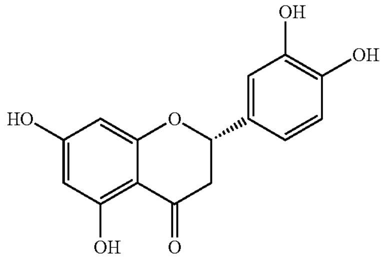

It was surprisingly found, that a flavoring composition according to the invention was able to—in such combination—synergistically improve certain taste characteristics, preferably mask the bitterness, astringency, metallic, sour, fermented, pea-like and yeasty taste, in preparations much stronger than the taste improvement conveyed by neoeriocitrin, eriocitrin, eriodictyol-7-O-glucoside and, respectively, eriodictyol alone.

Whenever there is an inconsistency between the name of the substance and the structural formula, the structural formula is to be considered as referred to. As the structures as shown above can occur as stereoisomers in nature, also the R and S-enantiomeric form are included in terms of the present invention. Furthermore, the glucosides can be bound as alpha- or beta-glycosidic bounds to the flavonoid moiety. Thus, these are also described by the compounds and structures as listed above in terms of the present invention.

One embodiment of the present invention relates to a flavoring composition, wherein the compounds (A) are obtained from a natural source by chemical or enzymatic hydrolysis.

A "natural source" in terms of the present invention means any material, which is grown in nature and not produced by any artificial chemical reaction initiated by humankind. "Natural sources" are preferably to be understood in terms of the present invention as plants.

Chemical hydrolysis is a process, wherein a chemical bond is cleaved by addition of a water molecule. This reaction can e.g. be performed under high temperatures.

Enzymatic hydrolysis is a process, wherein a chemical bond is cleaved under the aid of enzymes with the addition of water. Enzymes, which are able to perform a hydrolysis reaction, are called hydrolases.

In another embodiment of the present invention, the compounds (A) of the flavoring composition are obtained from a natural source from a plant selected from the group consisting of *Gleditsia capsica, Balanophora involucrata, Balanophora tobiracola, Chrysanthemum morifolium, Chrysanthellum indicum*, Citrus species, preferably *C. bergamia* and *C. limon, Dracocephalum rupestre, Viscum liquidambaricolum, Viscum coloratum, Viscum articulatum, Lasianthus japonicus, Lophophytum leandri, Elsholtzia bodinieri, Umbellularia californica. Lycopus europaeus, Buddleja parviflora, Eminium spiculatum, Coreopsis tinctoria, Cyclotrichiurn niveum, Arnica* longifolia, *Caryopteris incana, Mentha aquatica, Impatiens glandulifera.*

In terms of the present invention, it is particularly preferred, that the flavoring composition is obtained from a citrus source, especially preferably of Citrus bergamia and *Citrus limon*. Furthermore, it is preferred if the flavoring composition is obtained from a citrus extract by chemical or enzymatic hydrolysis.

Yet another embodiment of the present invention relates to a flavoring composition, wherein the composition comprises at least one additional flavoring substance selected from the group consisting of aliphatic flavoring substances, especially saturated aliphatic alcohols, such as ethanol, isopropanol, butanol, isoamyl alcohol, hexanol, 2-heptanol, octanol (1/2/3), decanol, unsaturated aliphatic alcohols, such as cis-2 pentenol, cis-3 hexenol, trans-2 hexenol, trans-3 hexenol, cis-2 octenol, 1-octen-3-ol, cis-6 nonen-1-ol, trans-2, cis-6 nonadienol, aliphatic aldehydes such as saturated aliphatic aldehydes (e.g. acetaldehyde, propionaldehyde, butyraldehyde, isobutyraldehyde, valeraldehyde, isolvaleraldehyde, homoeriodictyol, hexanal, 3-methyl hexanal, octanal, nonanal, or mono- or multi-unsaturated aliphatic aldehydes, such as 2-methyl but-2-enal, trans-2 hexenal, cis-3 hexenal, cis-4 hexenal, trans-2 octenal, trans-2 nonenal, cis-6 nonenal, trans-2, cis-6 nonadienal, trans 2 decenal, trans-2, trans-decadienal, aliphatic ketones, e.g. saturated ketones (such as 2-butanone, 2-pentanone, 2-heptanone, 2-octanone, 2-methylheptan-3-one, 2-decanone, 2-undecanone), unsaturated ketones (such as 1-penten-3-one, 1-hexen-3-one, 5-methyl-3-hexenone, 3-hepten-2-one, 1-octen-3-one, 2-octen-4-one, 3-octen-2-one, 3-none-2-one), aliphatic diketones and aliphatic diketoles, e.g. diacetyl, acetyl methyl carbinol, 2,3-hexanedione, aliphatic acids, such as straight-chain saturated acids, such as acetic acid, propionic acid, butyric acid, isobutyric acid, valeric acid, heptanoic acid, octanoic acid, decanoic acid, branched-chain saturated acids, such as 2-methyl heptanoic acid, 4-ethyl octanoic acid, and unsaturated acids, such as 2-butenoic acid, 2-pentenoic acid, 4-pentenoic acid, 2-methyl pentenoic acid, trans-3 hexenoic acid, cis-3 hexenoic acid, 3-octenoic acid, linoleic acid), aliphatic esters, such as saturated esters, e.g. methyl acetate, methylbutyrate, methyl-2-methylbutyrate, methyl hexanoate, ethylacetate, ethylbutyrate, ethyl-2-methylbutyrate, ethyl-3-methylbutyrate, ethyl hexanoate, ethyl decanoate, isopropyl acetate, isobutyl acetate, isobutyl valerate, isoamyl acetate, isoamyl butyrate, isoamyl isovalerate, hexyl acetate, hexyl hexanoate, 3-octyl acetate and unsaturated esters, such as methyl 2-hexenoate, allyl hexanoate, cis-3 hexenyl acetate, cis-3 hexenyl butyrate, aliphatic thiols and dithiols (e.g. propane thiol, allyl mercaptan, 1-methoxy-3-methylbutane-3-thiol, dimethyl sulfide, dimethyl trisulfide, dipropyl sulfide, diallyl trisulfide, other aliphatic sulfur compounds, such as 2-mercapto-3-butanol, methyl thio propanal, 3-mercapto-pentanone, 4-methoxy-2-methyl-2-mercaptobutanone, methyl thiobutyrate, methyl thiobutyrate, methyl 3-methylthiopropionate, aliphatic nitrogen compounds, such as butyl amine, trimethyl amine, allyl isothiocyanate, isopropyl isothiocyanate, alicyclic compounds, such as alicyclic ketones, e.g. cis-jasmone, isophorone, 4-ketoisophorone, alicyclic esters such as methyl jasmonate, hedione, terpenes, e.g. terpene alcohols, such as linalool, citronellol, geraniol, nerol, alpha terpineol, menthol, 8-p-menthene-1,2-diol, fenchol, borneol, nerolidol, hotrienol, terpene aldehydes such as geranial, neral, citronellal, beta-sinensal, terpene ketones, such as alpha-ionone, (D)-carvone, (L)-carvone, nootkatone, piperitone, menthone, alpha damascone, beta damascene, damascenone, terpene esters, such as linalyl acetate, geranyl acetate, citronellyl actetate, carvyl acetate, fenchyl acetate, terpene sulphur compounds, 4-mentha-8-thiol-3-one, thiogeraniol, para-menth-1-ene-8-thiol, mercapto p-menthan-3-one, terpene hydrocarbons, such as D-limonene, L-limonene, alpha-pinene, beta-pinene, ocimene, alpha-terpinene, gamma-terpinene, beta-bisabolene, valencene, terpene oxides, such as 1,8-cineole, rose oxide, mint lactone, menthofuran, aromatic compounds, e.g. aromatic alcohols, such as benzyl alcohol, cinnamyl alcohol, 2-phenyl alcohol, aromatic aldehydes, such as benzaldehyde, cinnamic aldehyde, 5-methyl-2-phenylhexenal, salicylaldehyde, 4-hydroxy benzaldehyde, cyclamen aldehyde, 2-phenyl-2-butenal, aromatic acids, such as 2-phenyl acetic acid, cinnamic acid, aromatic esters such as benzyl acetate, benzyl salicylate, anisyl acetate, methyl phenyl acetate, methyl benzoate, methyl salicylate, methyl cinnamate, aromatic phenols, such as phenol, ortho-cresol, para-cresol, 2,3-dimethyl phenyl, 2-ethyl phenol, 2,3,5-trimethyl phenol, 4-vinyl phenol, guaiacol, 4-vinyl guaiacol, eugenol, thymol, carvacrol, aromatic sulphur compounds, such as thiophenol, diphenyl disulphide, aromatic nitrogen compounds, such as methyl anthranilate, methyl N-methyl anthranilate, aromatic ethers such as vanillin, ethylvanillin, anethol, aromatic oxides, such as heliotropine, diphenyl oxide, aromatic lactones, such as coumarin, dihydro coumarin, heterocyclic compounds, such as heterocyclic lactones, e.g. gamma butyrolactone, gamma-nonalactone, gamma decalactone, delta decalactone, jasmin lactone, delta dodecalactone, ambrettolide, heterocyclic furanes, such as furfuryl alcohol, furfural, 2-acetyl furan, theaspirane, 2-methyl tetrahydrofuran-3-one, furfuryl mercaptane, 2-methyl 3-furanthiol, 2-methyl 3-tetrahydro furanthiol, difurfuryl sulfide, difurfuryl disulfide, heterocyclic pyrans, such as maltol, ethyl maltole, rose oxide, maltol isobutyrate, heterocyclic pyrroles such as indole, 2-acetyle pyrrole, pyrrolidine, heterocyclic pyrazines, such as 2-methyl pyrazine, 2,3-dimethyl pyrazine, 2-methyl 3-ethyl pyrazine, trimethyl pyrazine, 2-acetyl pyrazine, 2-methoxy 3-methyl pyrazine, 2-methoxy 3-ethyl pyrazine, 2-methoxy 3-isobutyl pyrazine, 2-ethyl 3-methylthio pyrazine, heterocyclic thiazoles, such as thiazole, 2-methyl thiazole, 4-methyl 5-vinyl thiazole, 2-isobutyl thiazole, 2-acetyl thiazole, flavoring raw materials and flavoring preparations, e.g. essential oils, concretes, absolutes, extract or tinctures from raw materials such as citrus (e.g. lemon, lime, mandarine, bergamotte, grapefruit bitter orange, peel or essence oils), herbs (dill, parsley, cumin, rosemary, sage, clary sage, basil, tarragon, thyme, oregano, savoury, majoram, all spice, mace, nutmeg, clove leave, clove bud, caraway, cinnamom leaves, cinnamom bark, cassia, cardamom, ginger, galangal, turmeric, coriander seed, coriander leaf, fenugreek, juniper berry, wormwood, laurel leaves, eucalyptus, white pepper, green pepper, white pepper, carrot seed, celery seed, lovage leaf, asa foetida, onion, leek, garlic, mustard, horse radish, capsicum, paprika, sea weed, valerian oil, fir needle, spearmint, peppermint, wintergreen, buchu leaf, black currant buds, fennel, star anise, jambu, long pepper, davana, orris, mimosa, cassie, violet leaves, ho leaf, jasmin, ylang ylang, cananga, osmanthus, angelica, clary sage, ambrette seed, hops, camomile, lavender, rose, geranium, citronella, palmarosa, litsea cubeba, lemon grass, tagetes, neroli, petitgrain, mate, cognac oil, coffee, cola nut, cocoa, green tea, blacktea, white tea, gentian, tolu balm, benzoe resin, peru balm, cascarilla, galbanum, vetiver, labdanum, patchouli, sandalwood, cedarwood, guaiac wood, oak wood, massoi bark, vanilla pods, tonka bean, as well as enriched fractions thereof, juice concentrates, such as orange juice, lemon juice, strawberry, cherry juice, or passion fruit juice concentrates, waterphases and recoveries from raw materials such as citrus (lemon, lime, orange, mandarine, grapefruit), apple, pear, quince, mispel, red fruits (raspberry, strawberry, blueberry, blackberry, Amellanchia (June plum), rose hip, cranberry, plum, prune, red and black currant, etc.) yellow fruits (peach, apricot, nectarine, banana, etc.), tropical fruits (mango, passionfruit, pineapple, lychee, etc.), vegetables (e.g. cucumber, tomato) and spices (e.g. ginger), acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene phthalide, carvone, camphene, caryophyllene, cineol, cinnamyl acetate, citral, citronellol, citronellal, citronellyl acetate, cyclohexyl acetate, cymene, damascone, decalactone, dihydrocoumarin, dimethyl anthranilate, dodecalactone, ethoxyethyl acetate, ethylbutyric acid, ethyl butyrate, ethyl caprate, ethyl caproate, ethyl crotonate, ethylfuraneol, ethylguaiacol, ethylisobutyrate, ethylisovalerate, ethyl lactate, ethylmethyl butyrate, ethyl propionate, eucalyptol, eugenol, ethyl heptylate, 4-(p-hydroxyphenyl)-2-butanone, gamma-decalactone, geraniol, geranyl acetate, geranyl acetate, grapefruit aldehyde, methyl dihydrojasmonate (e.g. Hedion@), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzyl acetone, isoamyl alcohol, isoamyl isovalerate, isobutyl butyrate, isobutyraldehyde, isoeugenol methyl ether, isopropyl methylthiazole, lauric acid, levulinic acid, linalool, linalool oxide, linalyl acetate, menthol, menthofuran, methyl anthranilate, methylbutanol, methylbutyric acid, 2-methylbutyl acetate, methyl caproate, methyl cinnamate, 5-methylfurfural, 3,2,2-methylcyclopentenolone, 6,5,2-methylheptenone, methyl dihydrojasmonate, methyl jasmonate, 2-methylmethyl butyrate, 2-methyl-2-pentenol acid, methylthiobutyrate, 3,1-methylthiohexanol, 3-methylthiohexyl acetate, nerol, nerol acetate, trans,trans-2,4-nonadienal, 2,4-nonadienol, 2,6-nonadienol, 2,4-nonadienol, nootkatone, delta-octalactone, gamma-octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl isovalerate, piperonal, propionaldehyde, propyl butyrate, pulegone, pulegol, sinensal, sulfurol, terpinene, terpineol, terpinolene, 8,3-s thiomenthanone, 4,4,2-thiomethylpentanone, thymol, delta-undecalactone, gamma-undecalactone, valencene, valeric acid, vanillin, acetoin, ethylvanillin, ethylvanillin isobutyrate (=3-ethoxy-4-isobutyryloxybenzaldehyde), 2,5-dimethyl-4-hydroxy-3 (2H)-furanone and derivatives thereof (here preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (here preferably ethyl maltol), coumarin and coumarin derivatives, gamma-lactones (here preferably gamma-undecalactone, gamma-nonalactone, gamma-decalactone), delta-lactones (here preferably 4-methyldeltadecalactone, massoilactone, deltadecalactone, tuberolactone), methyl sorbate, divanillin, 4-hydroxy-2(or 5)-ethyl-(or 2)-methyl-3 (2H) furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulphide, furfurylmercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3 (2H)-furanone, guaiacol, 3-hydroxy-4,5-dimethyl-2(5H)-furanone, 3-hydroxy-4-methyl-5-ethyl-2 (5H)-furanone, cinnamaldehyde, cinnamon alcohol, methyl salicylate, isopulegol and (here not explicitly stated) stereoisomers, enantiomers, positional isomers, diastereomers, cis/trans isomers or epimers of these substances.

Another embodiment of the present invention relates to a flavoring composition, wherein the composition comprises at least one sweet-tasting substance selected from the group consisting of natural sweeteners, preferably naturally occurring sweet tasting substances, including plant extracts, such as sweet tasting carbohydrates (such as sucrose, trehalose, lactose, maltose, melizitose, melibiose, raffinose, palatinose, lactulose, D-fructose, D-glucose, D-galactose, I-rhamnose, D-sorbose, D-mannose, D-tagatose, D-arabinose, I-arabinose, D-ribose, D-glyceraldehyde, D-allulose, maltodextrin), sugar alcohols (such as erythritol, threitol, arabitol, ribitol, xylitol, sorbitol, mannitol, maltitol, isomaltit, dulcitol, lactitol), proteins (such as miraculin, pentaidin, monellin, thaumatin, curculin, brazzein, mabinlin), D-amino acids (such as D-phenylalanine, D-tryptophan) or extracts or fractions obtained from natural sources containing these amino acids and/or proteins and the physiologically acceptable salts of these amino acids and/or proteins, particularly the sodium, potassium, calcium or ammonium salts thereof, neohesperidindihydrochalkon, naringindihydrochalkon, steviolgylcoside, stevioside, steviolbiosid, rebaudioside, rebaudioside A, rebaudioside B, rebaudioside C, rebaudioside D, rebaudioside E, rebaudioside F, rebaudioside G, rebaudioside H, rebaudioside M, rebaudioside N, rebaudioside X, dulcoside, rubusoside, suavioside A, suavioside B, suavioside G, suavioside H, suavioside 1, suavioside J, baiyunoside 1, baiyunoside 2, phlomisoside 1, phlomisoside 2, phlomisoside 3, phlomisoside 4, phloretin, phlyydulcin, abrusoside A, abrusoside B, abrusoside C, abrusoside D, cyclocaryoside A, cyclocaryoside 1, oslandin, polypodoside A, strogin 1, strogin, 2, strogin 4, selligueanin A, dihydroquercetin-3-acetate, perillartin, telosmosid A15, periandrin I-V, pterocaryoside, cyclocaryoside, mukurozioside, trans-anethol, trans-cinnamaldehyd, bryoside, bryonoside, bryonodulcoside, carnosifloside, hesperetin, scandenoside, gypenoside, hematoxylin, cyanin, chlorogenssure, albiziasaponin, telosmoside, gaudichaudiosid, mogrosides, such as mogroside V, hernandulcine, monatin, glycyrrhetinic acid and its derivatives, particularly glycyrrhizin, preferably glycyrrhizin ammonium salt, extracts or enriched fractions of such extracts such as extracts of *Thaumatococcus* or *Stevia* ssp., particularly *Stevia rebaudiana*, swingle extracts, particularly *Momordica* or *Siratia* grosvenorii or Luo-Han-Guo, extracts of *Glycyrrhiza* ssp., particularly *Glycyrrhyzia glabra*, extracts of *Hydrangea macrophylla* ssp., particularly *Hydrangea macrophlly serrata*, extracts of *Rubus* ssp., particularly *Rubus suavissimus*, extracts of *Lippia dulcis*, extracts of *Mycetia balansae*, preferably comprising balansin A and/or balansin B synthetic sweeteners, preferably synthetic sweet tasting substances, preferably selected from the group consisting of magap, sodium cyclamate or other physiologically acceptable salts of cyclamic acid, acesulfam K; neohesperidindihydrochalcone, naringindihydrochalcone, hesperetindihydrochalcone, saccharin, saccharin sodium salt, aspartam, superaspartam, neotam, alitam, advantam, perillartin, sucralose, lugduname, carrelame, sucrononate or sucrooctate or mixtures thereof.

It is especially preferable in terms of the present invention, that the flavoring composition according to the present invention comprises at least one additional sweetener selected from the group consisting of allulose, sucrose, trehalose, phloretin, naringenin, hesperetin, rubusoside, steviol glycosides (preferably rebaudioside A, rebaudioside D and rebaudioside M), mogroside V, phyllodulcin and hesperetin dihydrochalcone.

Another aspect of the present invention relates to the use of a flavoring composition according to the invention for masking and/or reducing at least one undesired taste characteristic in/of a preparation, preferably wherein the flavoring composition is used in an amount of 0.05 wt.-%, more preferably in an amount of 0.02 wt.-% and especially preferably in an amount of from 0.001 wt.-% to 0.01 wt.-%, dependent on the total weight of the preparation.

One embodiment of the use according to the present invention relates to the use of a flavoring composition according to the present invention, wherein the preparation is selected from the group consisting of preparations suitable for consumption, preferably a foodstuff, preparations for pleasure, beverages, semi-finished products and oral hygiene products.

Preferably, the at least one undesired taste characteristic is selected from the group consisting of bitterness, astringency, metallic taste, sour, fermented, pea-like and yeasty.

Bitterness, astringency and sour taste are taste impressions as defined above. A metallic taste can be perceived in preparations having contents of heavy metals such as multivitamin preparations containing for example copper, zinc and/or magnesium. Also, some medicaments can convey a metallic taste in the oral cavity. The off-taste of sweet tasting glycosides such as rebaudioside A is described as a combination of bitter and metallic.

A fermented taste is perceivable when consuming fermented, that means microbiologically converted preparations. The taste is described as being partly sour and partly savory and is desired for certain preparations, but can also be perceived as undesired and unpleasant.

A pea-like taste impression describes the taste of beans in a preparation, wherein this taste is not desired, e.g. protein-enriched food preparations.

A yeasty taste is especially present in preparations, which are prepared using yeast, such as bread, sparkling wine or beer. In certain preparations, this yeasty taste is desired, but it is perceived as unpleasant in other preparations or at high levels of yeast.

Another aspect of the present invention relates to a method for masking and/or reducing at least one undesired taste characteristic in/of a preparation, comprising or consisting of the steps:

a) providing at least one preparation, preferably selected from the group consisting of preparations suitable for consumption, preferably a foodstuff, preparations for pleasure, beverages, semi-finished products and oral hygiene products;
b) providing a flavoring composition according to the present invention;
c) contacting and mixing the preparation provided in step a) and the flavoring composition provided in step b);
d) obtaining a preparation with an improved taste.

It is especially preferable in terms of the present invention, that the undesired taste characteristic is selected from the group consisting of bitterness, astringency, metallic taste, sour, fermented, pea-like and yeasty.

In a preferred embodiment, the flavoring composition is produced or producible by a method for producing a flavoring composition as disclosed herein.

Yet another aspect of the present invention relates to a method for manufacturing a flavoring composition according to the present invention, comprising or consisting of the steps:

(i) providing a natural extract from at least one of the plants selected from the group consisting of *Gleditsia capsica, Balanophora involucrata, Balanophora tobiracola, Chrysanthemum morifolium, Chrysanthellum indicum*, Citrus species preferably *C. bergamia* and *C. limon, Dracocephalum rupestre, Viscum liquidambaricolum, Viscum coloratum, Viscum articulatum, Lasianthus japonicus, Lophophytum leandri, Elsholtzia bodinieri, Umbellularia californica. Lycopus europaeus, Buddleja parviflora, Eminium spiculatum, Coreopsis tinctoria, Cyclotrichiurn niveum, Arnica longifolia, Caryopteris* incana, *Mentha aquatica, Impatiens glandulifera;*
(ii) providing at least one hydrolase;
(iii) mixing the natural extract provided in step (i) with the at least one hydrolase provided in step ii);
(iv) incubating the mixture obtained in step iii) at a temperature in the range of from 20 to 60° C., preferably of from 40 to 60° C., optionally under stirring for a duration of from 0.5 to 48 hours, preferably of from 2 to 24 hours, preferably of from 4 to 12 hours;
(v) obtaining a flavoring composition according to the invention;
(vi) optionally: purifying the obtained flavoring composition of step (v);

and optionally:

(vii) adding additional flavoring and/or sweet-tasting substances to the flavoring composition, preferably as defined herein;
(viii) obtaining a flavoring composition according to the invention, preferably comprising additional flavoring and/or sweet-tasting substances as defined herein.

Furthermore, the present invention relates to a method for manufacturing a flavoring composition according to the invention, comprising or consisting of the steps:

(i) providing a natural extract from at least one of the plants selected from the group consisting of *Gleditsia* capsica, *Balanophora involucrata, Balanophora tobiracola, Chrysanthemum morifolium, Chrysanthellum indicum*, Citrus species preferably *C. bergamia* and *C. limon, Dracocephalum rupestre, Viscum liquidambaricolum, Viscum coloratum, Viscum articulatum, Lasianthus japonicus, Lophophytum leandri, Elsholtzia bodinieri, Umbellularia californica. Lycopus europaeus, Buddleja parviflora, Eminium spiculatum, Coreopsis tinctoria, Cyclotrichiurn niveum, Arnica longifolia, Caryopteris incana, Mentha aquatica, Impatiens glandulifera;*
(ii) providing at least one natural and non-volatile organic acid, preferably an acid selected from the group consisting of citric acid, tartaric acid, glycolic acid, malic acid, lactic acid, oxalic acid, malonic acid, succinic acid, glutaric acid, fumaric acid, maleic acid and mixtures thereof;

(iii) mixing the natural extract provided in step (i) with the at least one natural and non-volatile organic acid provided in step ii);

(iv) incubating the mixture obtained in step iii) at a temperature in the range of from 100 to 160° C., preferably of from 110 to 150° C., for a duration of from 4 to 48 hours, preferably of from 8 to 40 hours, preferably of from 12 to 36 hours (v) obtaining a flavoring composition according to the invention;

(vi) optionally: purifying the obtained flavoring composition of step (v);

and optionally:

(vii) adding additional flavoring and/or sweet-tasting substances to the flavoring composition, preferably as defined herein;

(viii) obtaining a flavoring composition according to the invention, preferably as defined herein.

Furthermore, the invention relates to a method for manufacturing a flavoring composition according to the invention, comprising or consisting of the steps:

(i) providing a natural extract from at least one of the plants selected from the group consisting of *Gleditsia* capsica, *Balanophora involucrata, Balanophora tobiracola, Chrysanthemum morifolium, Chrysanthellum indicum*, Citrus species preferably *C. bergamia* and *C. limon, Dracocephalum rupestre, Viscum liquidambaricolum, Viscum coloratum, Viscum articulatum, Lasianthus japonicus, Lophophytum leandri, Elsholtzia bodinieri, Umbellularia californica. Lycopus europaeus, Buddleja parviflora, Eminium spiculatum, Coreopsis tinctoria, Cyclotrichiurn niveum, Arnica longifolia, Caryopteris incana, Mentha aquatica, Impatiens glandulifera;*

(ii) providing at least one natural and non-volatile organic acid, preferably an acid selected from the group consisting of citric acid, tartaric acid, glycolic acid, malic acid, lactic acid, oxalic acid, malonic acid, succinic acid, glutaric acid, fumaric acid, maleic acid and mixtures thereof;

(iii) mixing the natural extract provided in step (i) with the at least one natural and non-volatile organic acid provided in step ii);

(iv) incubating the mixture obtained in step iii) at a temperature in the range of from 100 to 160° C., preferably of from 110 to 150° C., for a duration of from 4 to 48 hours, preferably of from 8 to 40 hours, preferably of from 12 to 36 hours;

(v) obtaining a flavoring composition according to the invention;

(vi) optionally: purifying the obtained flavoring composition of step (v);

(vii) providing at least one hydrolase;

(viii) mixing the composition obtained in step (v) or (vi) with the at least one hydrolase provided in step (vii)

(ix) incubating the mixture obtained in step (viii) at a temperature in the range of from 20 to 60° C., preferably of from 40 to 60° C., optionally under stirring for a duration of from 0.5 to 48 hours, preferably of from 2 to 24 hours, preferably of from 4 to 12 hours;

(x) obtaining a flavoring composition according to the invention;

(xi) optionally: purifying the obtained flavoring composition of step (x);

and optionally:

(xii) adding additional flavoring and/or sweet-tasting substances to the flavoring composition, preferably as defined herein;

(xiii) obtaining a flavoring composition according to the invention, preferably comprising additional flavoring and/or sweet-tasting substances as defined herein.

In steps (v) and (x) of the above method, a flavoring composition according to the invention is obtained. In both cases, the flavouring composition is according to the invention. However, in the composition obtained in step (x) of the above method, the amount of eriodictyol was further increased.

Preferably in the present text and in light of the above method, the term "composition according to the invention" refers to the composition obtained in step (v).

Preferably in the present text and in light of the above method, the term "composition according to the invention" refers to the composition obtained in step (x).

Preferably in the present text and in light of the above method, the term "composition according to the invention" refers to the composition obtained in step (v) and (x).

Preferably in the methods according to the invention providing at least one natural and non-volatile organic acid in step (ii) or (vii), the incubation in step (iv) is performed at a pressure in the range of from 2 to 6.5 bar, preferably in the range of from 3 to 6 bar, preferably in the range of from 3.5 to 5.5 bar, preferably in the range of from 4 to 5 bar.

It is preferred in terms of the present invention if the purification in step vi) of a method according to the invention is conducted by at least one method selected from the group consisting of absorption, adsorption, chromatography, crystallization, precipitation, liquid-liquid extraction, solid-liquid extraction, filtration, drying or freeze-drying. It is especially preferred if a combination of the methods selected from absorption, adsorption, chromatography, crystallization, precipitation, liquid-liquid extraction, solid-liquid extraction, filtration, drying or freeze-drying is used in terms of the method for manufacturing a flavoring composition is used.

One embodiment of a method for manufacturing a flavoring composition according to the present invention relates to a method, wherein the natural extract provided in step (i) is a citrus extract, preferably selected from *C. bergamia* and *C. limon.*

Another embodiment of a method for manufacturing a flavoring composition according to the present invention relates to a method, wherein the hydrolase provided in step (ii) or (vii) is a glucosidase and/or rhamnosidase.

A glucosidase is an enzyme, which is able to degrade complex carbohydrates by cleaving the carbohydrate bond between the sugar monomers.

A rhamnosidase is an enzyme, which catalyses the hydrolysis of terminal non-reducing L-rhamnose.

Another aspect of the present invention relates to a flavoring composition according to the invention, obtained or obtainable by a method for manufacturing a flavoring composition according to the present invention.

Also, the present invention relates to the use of the flavoring mixture as described herein, wherein the used flavoring composition is obtained or obtainable by a method for manufacturing a flavoring composition according to the present invention.

The invention is further characterized by illustrative, non-limiting examples.

EXAMPLES

Example 1: Paired Comparison Tests

A trained panel was given different samples with the bitter tasting substances caffeine (500 mg/kg), quinine (10 mg/kg) and naringin (100 mg/kg). Caffeine is the bitter principle of coffee and coffee-type beverages, quinine is used as food additive to flavor tonics or energy drinks and naringin is the bitter principle of grapefruit juice. Each test includes a different amount of bitter-masking substances or mixtures thereof. During the tests, the panellists wear nose-clips to exclude any olfactory impressions. These tests are referred to as bitter-duo tests.

In a first trial, above mentioned bitter samples were mixed with 10 mg/kg eriodictyol-7-O-glucoside at a purity of >95%. It was observed that the bitter-reducing effect was not significant ($p<0.05$). The data are shown in Table 1. At a concentration above 50 mg/kg, eriodictyol-7-O-glucoside shows even bitter notes.

TABLE 1

Bitter-duo test of eriodictyol-7-O-glucoside (>95%)

| Bitter agent | Number of panellists | Dosage [mg/kg] | Bitter masking activity (%) | t-test |
|---|---|---|---|---|
| Caffein | 20 | 10 | −1.94 | 0.87 |
| Quinine | 20 | 10 | −7.42 | 0.52 |
| Naringin | 20 | 10 | −2.59 | 0.81 |

In a second test, the bitter agents were mixed with 50 mg/kg eriocitrin at a purity of >95% and the bitter-masking effect evaluated by the panel. It was observed that the bitter masking effect was not significant ($p>0.05$). The data are shown in Table 2.

TABLE 2

Bitter-duo test of eriocitrin (>95%)

| Bitter agent | Number of panelists | Dosage [mg/kg] | Bitter masking activity (%) | t-test |
|---|---|---|---|---|
| Caffein | 20 | 10 | 5.6 | 0.76 |
| Quinine | 20 | 10 | −1.6 | 0.92 |
| Naringin | 20 | 10 | 0.8 | 0.96 |

Another trial was set-up using samples with 10 mg/kg quinine and 50 mg/kg eriodictyol (ED) alone or with an inventive flavoring composition containing eriodictyol-7-O-glucoside (EDMG) and neoeriocitrin (NEC) eriocitrin (EC). A synergistic effect of EDMG, EC and ED was found to improve the bitter masking activity significantly compared to pure eriodictyol. The same effect was observed when using neoeriocitrin instead of eriocitrin. The wt.-% are based on the dry weight of the flavoring composition. The results are displayed in Table 3.

TABLE 3

Bitter-duo test (10 mg/kg quinine) of eriodictyol and lemon peel extracts

| No. | Sample [wt.-%] | Number of panellists | Dosage [mg/kg] | Bitter masking activity [%] | t-test |
|---|---|---|---|---|---|
| 1 | ED | 19 | 50 | −31.0 | 0.037 |
| 2 | 69% ED, 1.2% EDMG, 1% EC | 19 | 50 | −32.4 | 0.025 |
| 3 | 41% ED, 21% EDMG, 1.9% EC | 18 | 50 | −58.7 | 0.031 |
| 4 | 55% ED, 11.1% EDMG, 1.5% EC | 20 | 50 | −50.7 | 0.003 |

Example 2: Manufacturing of a Flavoring Composition from Lemon Peel Extract

A lemon peel extract (300 g) and tartaric acid (39 g) are solved in water/acetone (2700 g). The mixture is filled in an autoclave. The hydrolysis starts after the temperature of 120° C. and a pressure of 5 bar is reached. The reaction ends after 35 hours. After the obtained black liquid has cooled, it was removed from the autoclave. By adding water, the target compounds are precipitated. The solid phase is separated by filtration. Overall, 126 g product in the solid phase, are obtained comprising eriodictyol (56.10 g), eriodictyol 7-O-glycoside (33.06 g) and eriocitrin (0,68 g) after drying.

Purification of the precipitated extract is done by separation of the target compounds by ad-/desorption on a solid phase. In this particular example, the precipitated extract is cleaned by adsorption on activated carbon material and recovery of target compounds by elution with different solvents: The column with activated carbon (surface: 1400 $m^2/g$; bed volume: 370 kg/m particle size: 7-75 μm; particle size $d_{50}$=30 μm) is conditioned with 7.5 fold water/acetone of bed volume. The precipitated extract is rinsed through the conditioned column. The first pass of product solution with a bed volume ratio of 3.5 to 1 was withdrawn. This first pass is referred to as first fraction. The target compounds are adsorbed on the stationary phase. Then, the components are desorbed step by step with water, methanol, ethanol, propan-2-ol, ethyl acetate and tert-methylbutyl ether. Elution takes place in a ratio of 4 to 1 of the eluting agent relative to the column volume. The fractions are brownish to slightly yellow to clear colorless. The highest content of eriocitrin and, eriodictyol-7-O-glucoside is eluted in the fractions with water and methanol, preferably in the fractions with methanol. The highest yield of eriodictyol at the lowest coloring is eluted in the methanol fraction. Elution of eriodictyol can be done with ethanol, propan-2-ol and ethyl acetate as well. The methanol fraction contained eriodictyol (58.0 g), eriodictyol-7-O-glucoside (41.7 g) and eriocitrin (0.3 g).

Other solvents than methanol, mixtures of solvents and different CV ratios can be used in order to achieve the same purification than with methanol as described herein. The column volume ration (CV) is the ratio of column bed volume and volume of solution flowing through column. The product was evaluated by a sensory panel (n=20). The bitter masking activity was assessed according to Example 1 and it was observed, that the lemon peel extract was able to significantly mask the bitterness of the quinine model solution.

Example 3: Manufacturing of a Flavoring Composition from Lemon Peel Extract

A lemon peel extract (100 g) and citric acid (13 g) are solved in water/acetone (900 g). The mixture is filled in the autoclave. The hydrolysis starts after the temperature of 120° C. and a pressure of 5 bar is reached. The reaction ends after hours. After the obtained black liquid has cooled, it was removed from the autoclave. The target compounds are precipitated by adding water. The solid fraction is separated by filtration. Overall 42 g product are obtained after drying comprising of eriodictyol (18.30 g), eriodictyol-7-O-glucoside (10.89 g) and eriocitrin (0.22 g).

The crude product (42 g) is solved in methanol (168 g) at room temperature. The solution is stirred and an anti-solvent crystallization is forced by adding water (630 g) and eriodictyol (14.56 g), eriodictyol-7-O-glucosidee (6.21 g) and eriocitrin (0.04 g) precipitates. By variation of concentration and temperature, different fractions with different ratios of eriodictyol (18.30 g), eriodictyol 7-O-glucoside (10.89 g) and eriocitrin (0.22 g) can be obtained.

Example 4: Manufacturing of a Flavoring Composition from Lemon Peel Extract

A lemon peel extract (30 g) and citric acid (16,4 g) are solved in water/acetone (270 g). The mixture is filled in the autoclave. The hydrolysis starts after the temperature of 120° C. and a pressure of 4 bar is reached. The reaction ends after 18 hours. After the obtained black liquid has cooled, it was removed from the autoclave. The secondary components are precipitated by adding water, separation by filtration. The target compounds are precipitated by adding water. The solid fraction is separated by filtration. Overall 11 g product are obtained after drying comprising eriodictyol (7,21 g), eriodictyol-7-O-glucoside (0,40 g) and eriocitrin (0.03 g).

Example 5: Manufacturing of a Flavoring Composition from Lemon Peel Extract by Enzymatic Hydrolysis A slightly acidified 20 g/L lemon peel extract solution was hydrolyzed with 25 mL/L Vegazym P-CS, a commercial enzyme preparation exhibiting rhamnosidase and glucosidase activity, in tap water stirring for 24 h at 40° C. The product was extracted three times with 40% of reaction volume ethyl acetate by stirring for 10 min followed by separating the phases via centrifugation for 20 min at 17.000×g. The combined organic phase was washed two times with 40% reaction volume tap water followed by drying under vacuum. The hydrolyzed product obtained after 24 h contained 0.01 wt.-% Eriocitrin 12.8 wt.-% Eriodictyol-7-O-glucoside, 69.5 wt.-% Eriodictyol.

Purification of the crude extract is done by precipitation. The crude extract is dissolved in ethanol at 40° C. and by adding water the target compounds precipitated. After filtration, the product contained 0.01 wt.-% Eriocitrin 3.90 wt.-% Eriodictyol-7-O-glucoside, 76.24 wt.-% Eriodictyol.

Example 6: Manufacturing of a Flavoring Composition from Lemon Peel Extract by Hydrolysis with Citric Acid and Enzymatic Hydrolysis A lemon peel extract (300 g) and tartaric acid (39 g) are solved in water/acetone (2700 g). The mixture is filled in the autoclave. The hydrolysis starts after the temperature of 120° C. and a pressure of 5 bar is reached. The reaction ends after 35 hours. After the obtained black liquid has cooled, it was removed from the autoclave. By adding water, the target compounds are precipitated. The solid material is obtained by filtration and an enzymatic hydrolysis is switched for 24 h at 50° C. with Vegazym P-CS with 50 ml/L. The target compounds are recovered by extraction with ethylacetate and concentration. The extract contained 0.01 wt.-% Eriocitrin 3.4 wt.-% Eriodictyol-7-O-glucoside, 72.6 wt.-% Eriodictyol.

Example 7: Taste Improvement of a Vegan Patty

A vegan patty has been produced containing the following ingredients: water, leguminose protein isolate, sun flower oil, leguminose protein concentrate, coconut oil, methylcellulose, fiber, salt, starch, lactic acid and sodium diacetate. Water, thickener and starch are mixed with water, pH is adjusted, proteins are added next followed by fibre and oil ingredients. Finally, a taste masking ingredient according to Table 4 is added. The ingredients are thoroughly mixed and the dough is formed to patties. The patties where baked in an oven at 200° C. After cooling the patties, patties were sliced and samples were coded for a blind tasting with a panel.

TABLE 4

Sensory profile of vegan patties with an inventive composition (No. 4) in comparison to pure bitter masking compounds

| No. | Bitter masking agent | Dosage [mg/kg] | Sensory profile |
|---|---|---|---|
| 1 | None | None | bitter, astringent aftertaste, bread-like, roasty |
| 2 | Eriodyctiol 98% purity | 0.005 | roasty, bread-like, bitter, dry |
| 3 | Homoeriodictyol 70% purity | 0.10 | bitterness less intense, roasty, juicy |
| 4 | 41 wt.-% ED, 21 wt.-% EDMG, 1.9 wt.-% EC | 0.005 | less bitter, best off-taste masking, juicy |

The vegan patties tasted bitter, astringent with bread-like, roasty notes (Table 4, no. 1). The addition of bitter masking compounds eriodictyol and homoeriodictyol as described in EP 1258200 A1 improved the taste profile, whereas homoeriodictyol reduced the bitterness more than eriodictyol. However, the taste improving and bitter masking property of the inventive flavoring composition from lemon peel extract showed the best performance.

Example 8: Flavoring Compositions

The said mixture can be compared with further taste modulating compounds to impart taste modulating sensory effects. Naringenin and hesperetin have been used as an example and the results are displayed in Table 5. A masking mixture comprising three parts hesperetin, two parts naringenin and two parts of the inventive citrus hydrolysate (55 wt.-% ED, 11.1 wt.-% EDMG, 1.5 wt.-% EC) was tested with 50 mg/kg dosage against naringenin, hesperetin and homoeriodictyol (No. 1-3, Table 5). The compounds and the mixture were all solved in water with added 500 mg/kg caffeine as bitter agent. The panelists were asked to rate the bitter intensity of each sample of one sample pair on a scale of 1-100. The results show that the masking mixture is significantly (t-test=0.0039) masking the bitterness of caffein solution (No. 4, Table 5) The bitter masking activity is higher than of homoeriodictyol (in direct comparison test no. 3, Table 5, −6,1% reduction), even higher than of hesperetin (in direct comparison test no. 2, Table 5, −16,4% reduction) and highest in direct comparison to naringenin (test no. 1, Table 5, −21,7% reduction). This demonstrates that naringenin and hesperetin alone are not potent bitter masking compounds, but formulated together with the inventive citrus hydrolysate they develop significant bitter masking activity and that the bitter masking activity is then at least as high than of homoeriodictyol although the masking mixture contains only approx. 5 mg/kg eriodictyol. Said mixtures can be obtained by mixing the inventive citrus hydrolysate with hydrolysates from orange (yielding hesperetin), grapefruit or bergamot (yielding naringenin) or bitter orange and lime among other citrus fruits.

TABLE 5

Bitter masking activity of the inventive composition in comparison to taste modulating compounds naringenin, hesperetin and homoeriodictyol.

| No. | Taste modulator | Bitter intensity [0-100] of base | Dosage of inventive composition [mg/kg] | Bitter intensity [0-100] | Masking effect [%] |
|---|---|---|---|---|---|
| 1 | Naringenin (50 mg/kg) | 36.4 | 50 | 28.5 | −21.7 |
| 2 | Hesperetin (50 mg/kg) | 39 | 50 | 32.6 | −16.4 |
| 3 | Homoeriodictyol (50 mg/kg) | 37.5 | 50 | 35.2 | −6.1 |
| 4 | Inventive composition | 38.5 | 50 | 27.5 | −28.6 |

Example 9: Taste Improvement of Protein Food

A protein enriched food was produced by adding 100 g hot water to 0.5 g Agar Agar (CERO Agar Agar Gelidium Type 8952), stirring with 750 rpm at 55° C. and finally adding 10 wt.-% of pea (preparation 1) and soy protein (preparation 2) concentrate. Mixtures were homogenized and finally filled in cups. The sample thickened and formed a homogenous and stable matrix by cooling down to 8° C. for 20 min. Each sample was pairwise tasted against a sample with an inventive composition, namely a lemon peel hydrolysate according to sample no. 4 from Table 3. The samples were coded and tasted by five flavorists. The intensity of sensory attributes was determined on a scale of 0-10.

TABLE 6

Pairwise comparison of pea protein fortified product with/without addition of lemon peel hydrolysate

| Attribute | Preparation 1 (Pea) | Preparation 1 + 100 mg/kg lemon peel hydrolysate (Sample no. 4, Table 3) |
|---|---|---|
| Green | 3 | 3.5 |
| Potato | 3.5 | 3 |
| Earthy | 2 | 0 |
| Neroli | 2.5 | 0 |
| Green | 6 | 6 |
| Astringent | 5 | 4 |
| Bitter | 8 | 4 |
| Peapod taste | 9 | 6 |
| Umami | 0 | 1.5 |

TABLE 7

Pairwise comparison of soy protein fortified product with/without addition of lemon peel hydrolysate

| Attribute | Preparation (Soy) | Preparation 2 + 100 mg/kg lemon peel hydrolysate (Sample no. 4, Table 3) |
|---|---|---|
| Yeasty | 9 | 8 |
| Mouldy | 3 | 4 |
| Bitter | 6.5 | 4 |
| Sour | 5 | 4 |
| Burnt | 8 | 8.5 |

The sensory data show that off-tastes like bitter, astringent, sour and peapod taste can be reduced by adding 100 mg/kg lemon peel hydrolysate according to sample no. 4 from Table 3.

The invention claimed is:

1. A flavoring composition comprising:

(a) about 1.9 wt. % of eriocitrin;

(b) about 21 wt. % of eriodictyol-7-O-glucoside;

(c) about 41 wt. % of eriodictyol; and (d) optionally, 0.01 to 40 wt. % of neoeriocitrin;

all weight percentages based on total dry weight of the flavoring composition.

2. A flavoring composition comprising:

(a) about 1.5 wt. % of eriocitrin;

(b) about 11.1 wt. % of eriodictyol-7-O-glucoside;

(c) about 55 wt. % of eriodictyol; and (d) optionally, 0.01 to 40 wt. % of neoeriocitrin;

all weight percentages based on total dry weight of the flavoring composition.

* * * * *